United States Patent [19]
Talbott, Jr.

[11] 4,181,029
[45] Jan. 1, 1980

[54] MULTI-AXIS, COMPLEX MODE PNEUMATICALLY ACTUATED ANNULAR FRAME SHAKER FOR QUASI-RANDOM PNEUMATIC VIBRATION FACILITY

[75] Inventor: Charles F. Talbott, Jr., Chatsworth, Calif.

[73] Assignee: Hughes Aircraft Company, Culver City, Calif.

[21] Appl. No.: 897,824

[22] Filed: Apr. 19, 1978

[51] Int. Cl.$^2$ .......................................... G01N 29/00
[52] U.S. Cl. ................................................... 73/665
[58] Field of Search ................. 73/665, 663, 664, 666, 73/667, 668

[56] References Cited
U.S. PATENT DOCUMENTS

| | | | |
|---|---|---|---|
| 3,686,927 | 8/1972 | Scharton | 73/665 |
| 4,011,749 | 3/1977 | Cappel | 73/665 |

*Primary Examiner*—Jerry W. Myracle
*Attorney, Agent, or Firm*—Lewis B. Sternfels; W. H. MacAllister

[57] ABSTRACT

Pneumatically driven vibrators coupled to resonating, self-attenuating structures define a shaker which, when included in a vibration system, enables a test item to be vibration tested under controlled conditions of multi-frequency, multi-degree-of-freedom acceleration history, to achieve a frequency spectrum and acceleration-level control of a broadband quasi-random vibration output in the frequency range, for example, from 40 Hz to 2 kHz for vibration testing of equipment. The driving set of annular structure responds to an intense vibration spectrum, created by the attached pneumatic vibrators, with multi-modal forced and resonant frequencies in limited directions. The driven set of annular structure, holding the test hardware, responds with forced and harmonic oscillations to a vibration field transmitted from the driving set of structure through a specially designed elastomeric path. Specific design of the size, mass, and resonant behavior of the driving and driven structure sets with appropriate transmissibility characteristics of the elastomeric interface results in a controlled multi-modal, uniform RMS acceleration, multi-degree-of-freedom, wide-frequency-range vibration testing method. The annular arrangement of structure takes advantage of the complex amplitude-displacement behavior of the circumference of a ring excited into multi-modal in-plane and out-of-plane bending and torsional activity by the attached vibrators. Changes in pneumatic vibrator operating pressure change vibrator frequencies and expand available modal density.

11 Claims, 12 Drawing Figures

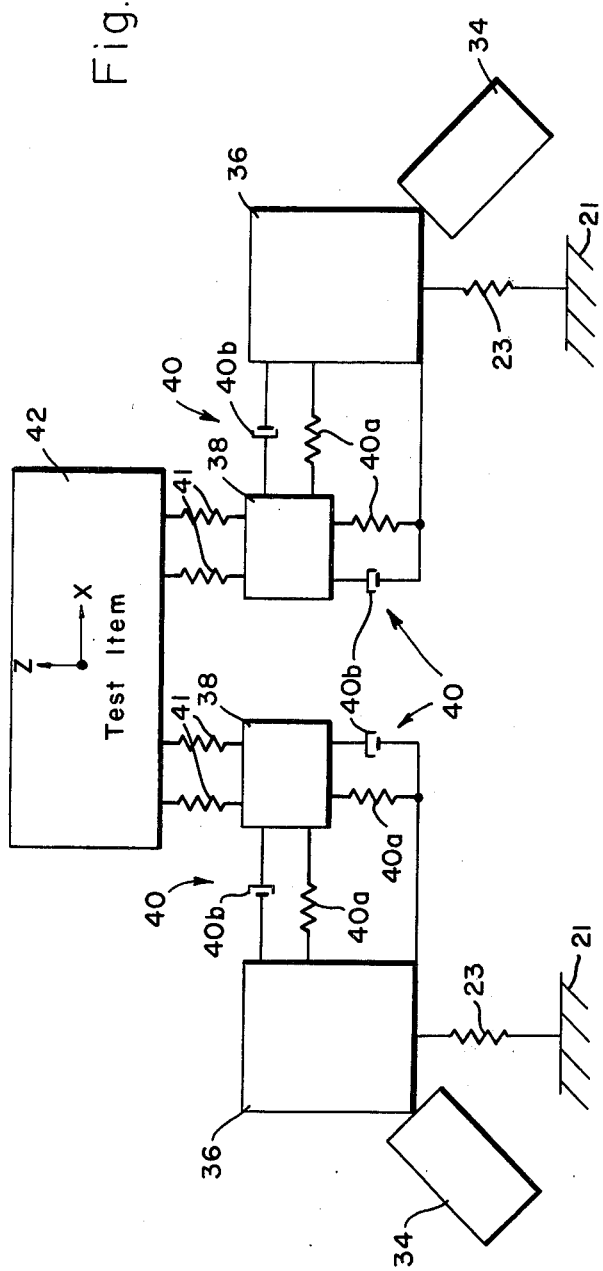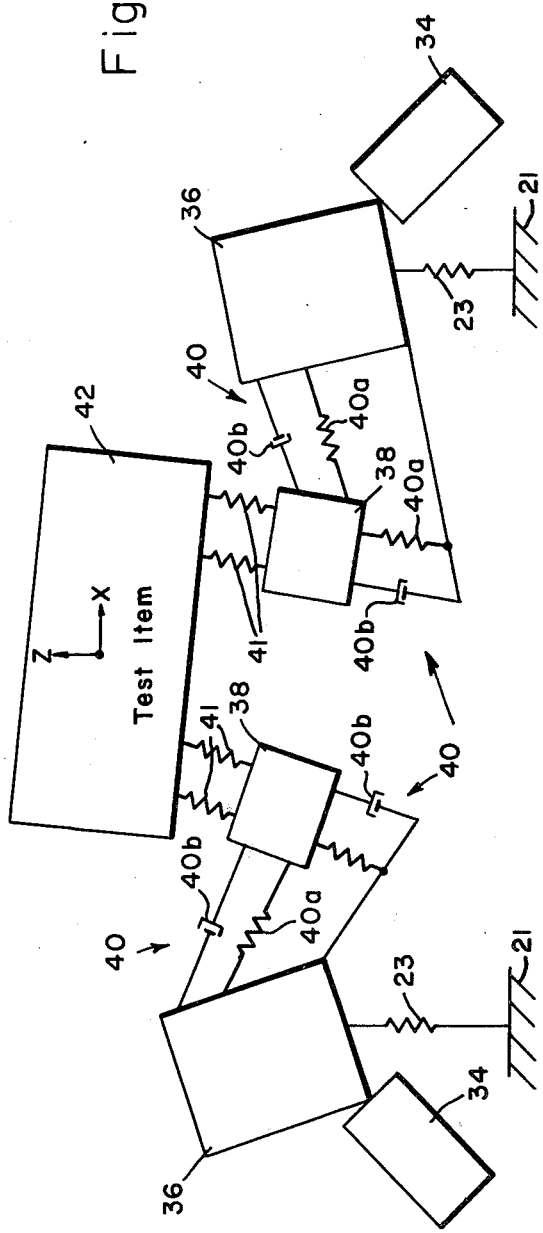

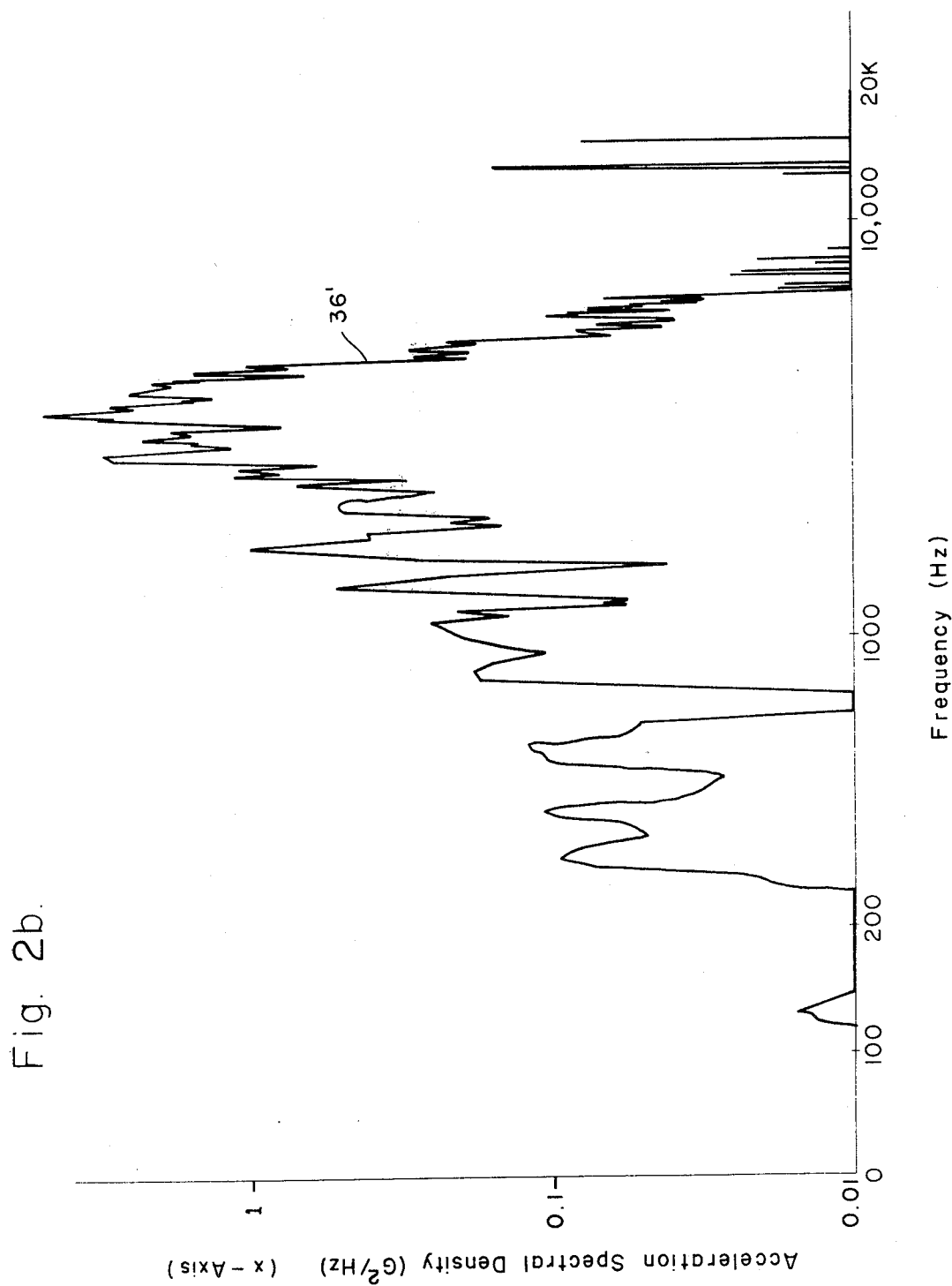

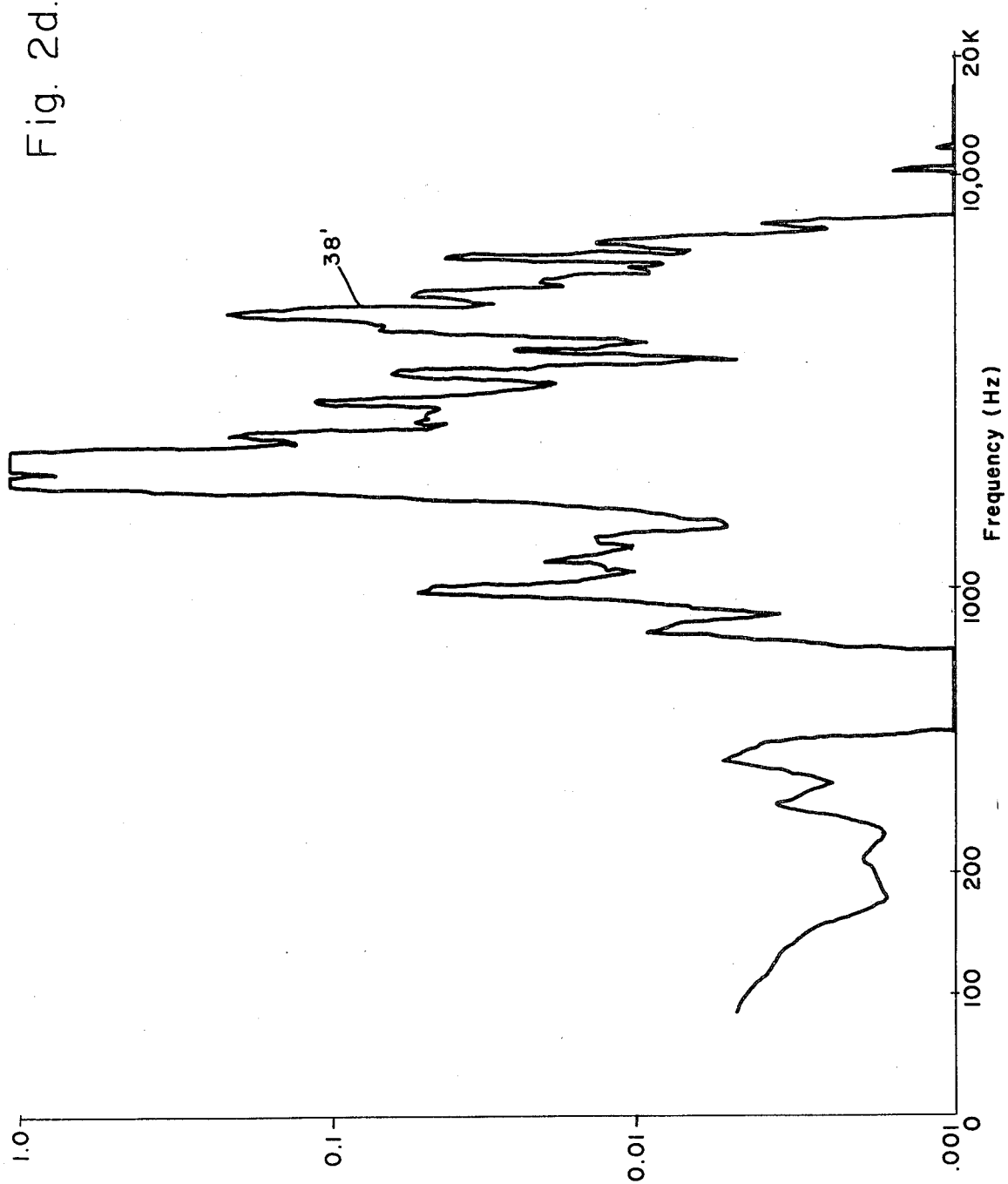

MULTI-AXIS, COMPLEX MODE PNEUMATICALLY ACTUATED ANNULAR FRAME SHAKER FOR QUASI-RANDOM PNEUMATIC VIBRATION FACILITY

BACKGROUND OF THE INVENTION

1. Field of the Invention

The present invention relates to multi-degree-of-freedom vibration test equipment and, in particular, such equipment employing pneumatic vibrators and incorporating automatic frequency modulation and acceleration level control, e.g., for proof of workmanship, for operational screening, and for engineering development tests and, in particular, a vibration shaker actuated by pneumatic vibrators.

As used herein, the terms "quasi-random" and "pseudo-random" are defined as follows. "Quasi-random" vibration can be described as a line spectrum with equally spaced lines, e.g., harmonics, whose fundamental frequency varies randomly with time within a restructed frequency range, e.g., vibrator frequency excursion during modulation, which, in turn, causes a random fluctuation in the amplitudes, (e.g., accelerations) at the spectral lines. The fundamental frequency fluctuates sufficiently to produce an essentially continuous spectrum when averaged over a long enough time interval. By "pseudo-random", it is meant that there is a mathematical method or algorithm for selecting a sequence of numbers, e.g., for use in modulating the driving means for the vibrators. "Pseudo" means that the randomness is not purely random because the sequence results from predetermined calculations.

Also as used herein, the terms "multi-degree-of-freedom", "spectrum" and "multi-modal" are defined as follows. "Multi-degree-of-freedom" is used to define the ability of structure to translate and rotate in several directions simultaneously within given bounds. "Spectrum", e.g., as in "intense vibration spectrum", means the cumulative time history of the vibration (e.g., in $G^2/Hz$) as related to the frequency associated with a particular level of vibration. "Multi-modal" means the simultaneous occurrence of many structural vibrational modes, or dynamic displacements.

As further used herein, a "node" is defined as a point on a vibrating structure when vibrational displacements are zero or nearly zero in at least one direction. An "anti-node" is a point where maximum vibrational displacements occur in one or more directions.

2. Description of the Prior Art and Background Considerations

Prior art vibration screening of equipment, e.g., airborne radar units, infrared sensors and missiles, was accomplished by single-axis mechanical vibration apparatus working with fundamental frequency of excitation and uncontrolled harmonics. Alternatively, electrodynamic shakers and control systems were employed for single-axis or, in groups, multi-axis testing. Such systems are very expensive, and multi-axis configurations present problems as to the coherence of acceleration inputs.

The use of multiple pneumatic vibrators for the simulation of random vibration was first suggested by General Dynamics Corporation in a paper in *Shock & Vibration Bulletin*, No. 46, part 3, August 1976, pp. 1–14. This paper describes a missile test in which nine pneumatic vibrators are attached directly to a freely suspended missile. An approximation of measured in-flight random vibration was obtained. Frequency spectrum and acceleration level were determined by the number and size of the attached vibrators and the mean air pressure. The supply pressure was modulated in a periodic form to prevent locking on the first bending mode of the missile structure and to fill in the frequency spectrum. In a panel discussion reported in the *Journal of Environmental Sciences*, November/December 1976, pp. 32–38, Westinghouse Electric Corporation discloses development of a pneumatic vibrator system for testing avionics equipment. Pneumatic vibrators are said to be attached directly to rigid vibration fixtures to achieve a two-axis excitation. Air pressure is modulated to minimize the line spectrum. Major emphasis is aimed at achieving significant vibration energy content at frequencies below 500 Hz.

Other prior work in relevant technology is disclosed in U.S. Pat. Nos. 4,011,749; 3,686,927 and 3,710,082.

U.S. Pat. No. 4,011,749 describes a multi-degree-of-freedom shaker whose rigid test table is given time-variant displacements by a complex hydraulic actuation system with six degrees of freedom. The shaker is controllable at the expense of great complexity and mass.

U.S. Pat. No. 3,686,927 discloses a method for coupling selected plates, beams, or concentric cylinders with other beams or resonating intermediate structure to effect multi-modal vibration fields for test articles. The system described is controlled by excitation frequency and amplitude only.

U.S. Pat. No. 3,710,082 describes a method of controlling vibrations to a pre-determined frequency content by digitally sensing the vibration response (analog plus analog to digital converter), determining the frequency domain (Fourier transform), comparing it with a pre-determined spectrum, combining it with (by multiplying it by) a random number (sine and cosine of four angles), transforming to a time domain (inverse Fourier transform), converting to analog and subsequently exciting an electronically driven shaker table.

SUMMARY OF THE INVENTION

Pneumatically driven vibrators coupled to resonating, compliant, simply excited self-attenuating structures define a shaker which enables a test item to be vibration tested under controlled conditions of multi-frequency, multi-degree-of-freedom acceleration history, to achieve frequency spectrum and acceleration-level control of a broadband quasi-random vibration output in the frequency range, for example, from 40 Hz to 2 kHz for vibration testing of equipment.

The driving set of annular structure responds to an intense vibration spectrum, created by the attached pneumatic vibrators, with multi-modal forced and resonant frequencies in multiple directions. The driven set of annular structure, holding the test hardware, responds with forced and harmonic oscillations to a modulated vibration field transmitted from the driving structure set through a specially designed elastomeric path. Specific design of the size, mass, and resonant behavior of the driving and driven structure sets with appropriate transmissibility characteristics of the elastomeric interface results in a heretofore unachieved controlled multi-modal, uniform RMS acceleration, multi-degree-of-freedom, wide-frequency-range vibration testing method. Change in pneumatic vibrator operating pressure changes vibrator frequencies and expand available modal density.

The annular arrangement of structure takes advantage of the complex amplitude-displacement behavior of the circumference of a ring excited in multi-modal in-plane and out-of-plane bending and torsional activity by the attached vibrators. Changes in operating pressure of the pneumatic vibrators further increase the available vibration modal density. The surfaces of the configuration of annular vibrating structures present greater complexity of modal activity in frequency, amplitude, and direction than that shown for the planar plates represented in copending patent application, Serial No. 897,823 entitled "Multi-Axis, Complex Mode Pneumatically Actuated Plate/Space Frame Shaker for Quasi-Random Pneumatic Vibration Facility" by Charles F. Talbott, Jr., filed herewith.

Automatic control and pseudo-random modulation of air pressure of the pneumatic vibrators provide closed loop acceleration spectrum control and spectrum smearing in and about three orthogonal axes simultaneously to enhance frequency content and to prevent the shaker from locking onto any particular vibration frequency, especially a natural frequency of the test article, thus affording a realistic simulation of operational environments. The vibrators' vibration frequency is modulated by supplied air pressure. Means for modulating the air supply pressure automatically and quickly permits changes in the vibration frequencies of the vibrators. The vibrators are mechanically processed by the driving and driven sets of structure into the desired form of vibrational excitation to be exerted on the test item.

More specifically, the vibrators are coupled to a driving annular structure which is coupled to a driven annular structure by elastomeric materials. A test item supporting platform is characterized by natural frequencies different from those of the driven annular structure is connected by several attachments to the driven annular structure and thus becomes part of the complex multi-modal driven structure. The test item is secured to the platform part of the driven structure. The physical properties of the elastomeric materials are used to direct, filter, and attenuate the amplitude and frequency of the time-space variant displacements from the driving structure interface to the driven structure interface. The non-linear transmissive properties of these elastomers are used to control the transmissibility over a frequency range below 2 kHz and also to inhibit vibration transmission above 2 kHz. This is possible because damping and stiffness properties change with certain frequencies and with changes in pressure on the elastomer surfaces.

The driving structure vibrates in multiple bending and torsional modes imparting displacements at each annular coupling interface. These displacements occur at many different rates and amplitudes along the length and breadth of the annular interfaces and are mechanically processed through the elastomer coupling to effect smaller displacements at like or dissimilar frequencies in the driven annular structure. Coupling the resultant normally non-synchronous, multi-degree-of-freedom displacements of the driven annular through annular attaching to a flexible supporting platform for a test article creates a resultant multi-degree-of-freedom (i.e., orthogonal translatory and multi-rotational) out-of-phase displacement-time history at the driven structure interface with the test hardware due to ring bending in and out of plane and torsional modes about the ring axis.

The modal density of the driven structures vibration history is governed both by the vibrations introduced through the elastomer couplings from the driving structures and by the asymmetric ring-bending and platform bending and torsional component harmonic coupled frequencies of the driven structures. Mutually coupled vibration modes of driving-driven structures sets are subject to the effects of both the elastomer's geometric contact patterns between adjacent rings or annular structures and the transmissibility characteristics of the elastomeric couplings. Further modulating of the excitation history to which test articles are exposed may be obtained by interposing a selected configuration of flexible structure or of elastomer material between sets of driven structure, for example, to further modify frequency and displacement-directional history. The test article may be fixed to a number of attachments on the driven platform structure or it may be supported by an interfacing rigid fixture attached to the platform. By modulating the pneumatic vibrator output by pressure changes, a beneficial forced frequency smearing of the power spectrum can be effected. Alteration of the flat pattern shape, consistency and stiffness/damping character of the elastomer offers a technique for selective frequency/amplitude modulation and/or control.

In conjunction with a closed-loop, quasi-random pneumatic pressure control system, the present invention provides the modal density and RMS acceleration uniformity for multi-degrees-of-freedom with desired frequency roll-off above 2 kHz due to low-frequency design and due to elastomer damping behavior.

The control system controls vibration to a preselected value by periodically sensing the vibration coordinate axis acceleration response about the test item, computing the root-mean-square response, comparing it with a preselected root-mean-square acceleration value, and digitally adjusting the air supply to the pneumatic vibrators. In addition, the predetermined spectrum of the shaker system is also controlled mechanically.

In the overall performance of the vibration scheme, the output of the pneumatic vibrators is altered through pressure modulation of the vibrators, to result in effective augmentation of the output and in vibration spectrum smearing. Pressure modulation is achieved by modulation of the area of an orifice located between the air supply and the pneumatic vibrator drive manifold. A microprocessor is programmed with a semi-empirical relationship between the orifice area and the test-item frequency response. During a test, the microprocessor periodically varies the orifice area by means of an air-pressure-modulation flow-control mechanism and drive circuitry using a pseudo-random number algorithm to produce a desired, e.g., uniform distribution of values of the drive-manifold pressure.

Pressure variations produce changes in acceleration response of the test item. Spectrum smearing and any problems resulting from acceleration variation are reconciled through an automatic control system. Automatic level control is based on periodic comparison of an estimate of the root-mean-square acceleration with the test-level setting. Acceleration feedback from the three orthogonal axes is fed through a low-pass filter (e.g. 2 kHz) and a sample-and-hold function to a multiplexer, and digitized by means of an analog-to-digital converter. The unfiltered signals also are fed through an auxiliary multiplexer to a peak detector, from which is derived a fast-action over-test detector function. The microprocessor subsystem performs the balance of the data acquisition. Each of the digital accelerometer signals is processed to create an estimate of the root-mean-square acceleration level. The drive pressure required for the specified test level is adjusted periodically during a test by automatic servo adjustment of a pressure regulator through appropriate drive circuitry.

It is, therefore, an object of the invention to provide a means for vibrating a test item in a controlled fashion.

Another object is to provide a method for screening, burn-in, quality control, etc., testing of electronic and other equipment, particular under operating conditions.

Another object is to provide for a test method operable under conditions of controlled frequency bandwith, variable modal density, and multi-directional acceleration history with uniform RMS acceleration levels in specified directions.

Another object is to provide for simultaneous tri-axial broadband quasi-random vibration.

Another object is to provide for a vibration system which, in comparison with conventional the conventional systems, is of small cost.

Another object is to provide for such a variation system which is readily adaptable to a wide range of product sizes and shapes.

Another object is to provide for a compact, self-contained system which requires only normal shop air and electrical power.

Another object is to provide for a simple and inexpensively maintainable system.

Other aims and objects as well as a more complete understanding of the present invention will appear from the following explanation of exemplary embodiments and the accompanying drawings thereof.

DESCRIPTION OF THE PREFERRED EMBODIMENTS

Figure 1:
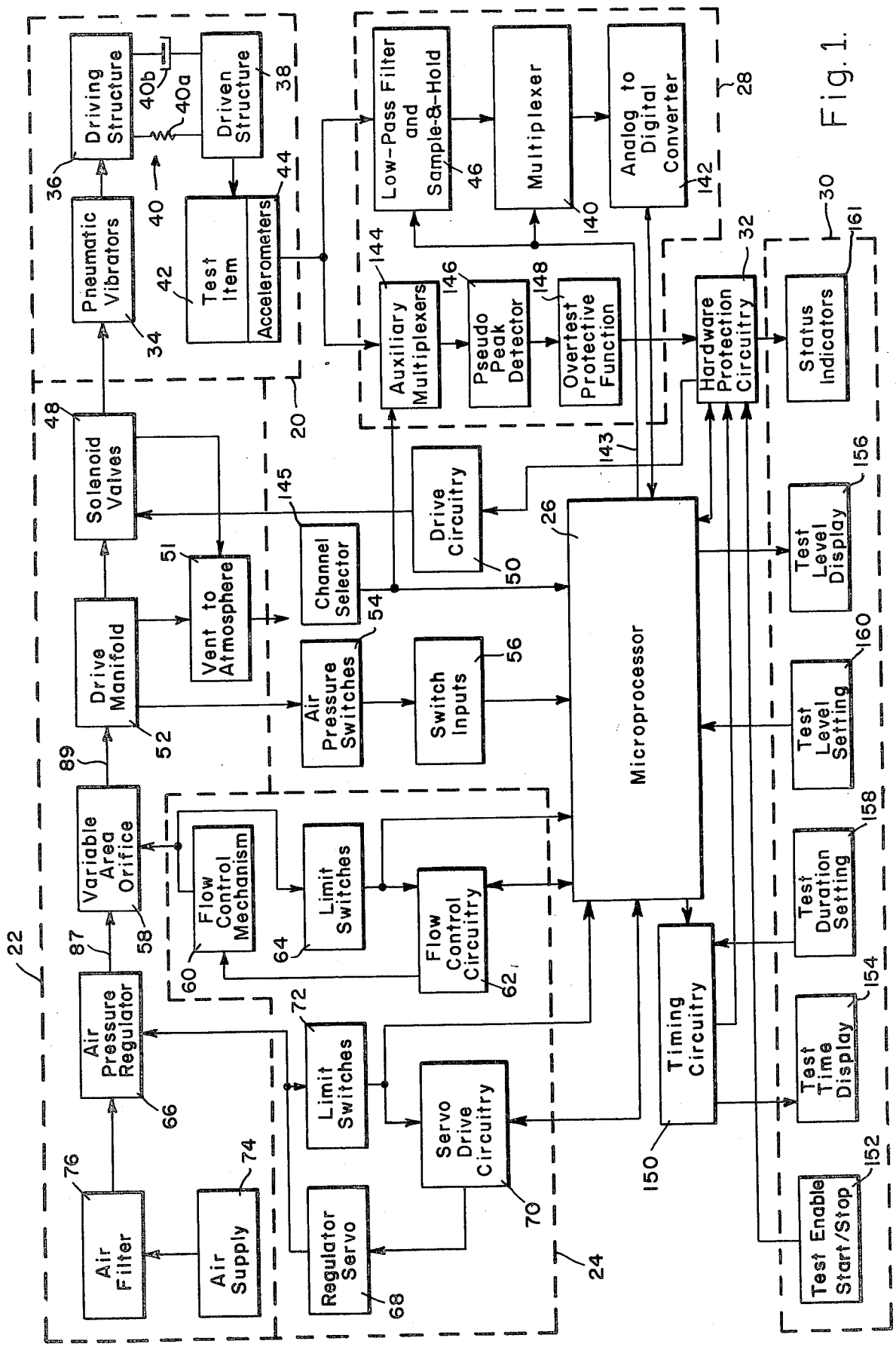
FIG. 1 illustrates the overall facility and modulating system therefor in block diagram.

Referring now to FIG. 1, a vibration system, which is more fully disclosed in copending patent application, Ser. No. 897,821, filed herewith, entitled "Quasi-Random Pneumatic Vibration Facility and Automatic Frequency Modulating System," by Henry T. Abstein, Dennis B. Page, James M. Kallis, Charles F. Talbott, Jr. and Richard L. Baker, is illustrated as being subdivided into several major subsystems. These subsystems include a shaker table assembly 20, an air pressure and flow control mechanism 22 pneumatically coupled to shaker table assembly 20, air pressure and flow control drive circuitry 24 coupled to mechanism 22 for regulating the pressure level and quantity of air delivered therethrough, a microprocessor 26 coupled to air pressure and flow control mechanism 22 for insuring that the pressure level and quantity of air delivered to shaker table assembly 20 is sufficient for driving the same, a feedback and over-test protective subsystem 28 electrically coupled between shaker table assembly 20 and microprocessor 26 to insure that the micro-processor is provided with the necessary feedback information to properly function, operator interface subsystem 30 for enabling an operator to establish the proper test parameters as well as to be informed thereof, and hardware protection circuitry 32 interposed between microprocessor 26 and drive circuitry 50 for control of "ON-OFF" solenoid valves 48 in air pressure and flow control mechanism 22 to protect the system from excessive vibrational levels that might otherwise injure the device being tested. Air pressure switches 54 and switch inputs 56 couple a drive manifold 52 in mechanism 22 to microprocessor 26.

In initially describing the system operation, the output of shaker table assembly 20 with a test item thereon is fed back through subsystem 28 and compared with a preselected vibrational setting in microprocessor 26 to generate an error signal which, in turn, is applied through air pressure and flow control circuitry 24 to air pressure and flow control mechanism 22. Mechanism 22 then causes structure in shaker table assembly 20 to vibrate a specimen in a controlled manner, and the shaker's vibratory output is fed back as described above.

With reference also to FIGS. 2' and 2" and as will be more fully described below with respect to FIGS. 3–5, shaker table assembly 20 includes a plurality of pneumatic vibrators collectively identified by indicium 34 which are coupled to a driving structure 36 to impart vibratory inputs thereto, as noted in FIGS. 2' and 2". The entire assembly is supported at or near driven structure node points on isolators 23 (see FIG. 3). As shown in FIG. 2", the driving structure is caused to assume varying modes of vibration based upon forced harmonic response to the excitation inputs from the vibrators in conjunction and on natural multimodal response of the structure due to the specifically designed physical configuration and material properties, which are typically of aluminum and/or magnesium. The dynamic distortions, which result from the many modes of forced and natural vibration and which are greatly exaggerated as shown in FIG. 2", are modified and transmitted to a driven structure 38 by means of a visco-elastic construction 40 having, for example, resilient components 40a and damping components 40b. Driven structure 38, therefore, will assume complex modes of dynamic distortion composed of multimodal space-frame dynamics imposed on multi-modal plate behavior, also which are shown in exaggeration in FIG. 2" and which are superpositions of forced and natural vibration modes of driven structure 38 and of the dominant modes imparted from driving structure 36. Maximizing coupled multimodal response between the driving and the driven structures is enhanced by situating and attaching a platform 41 on driven annular structure 38. A test item 42 is attached on platform 41 in a pattern which emphasizes a plurality of nodes and anti-nodes.

Figure 2A:
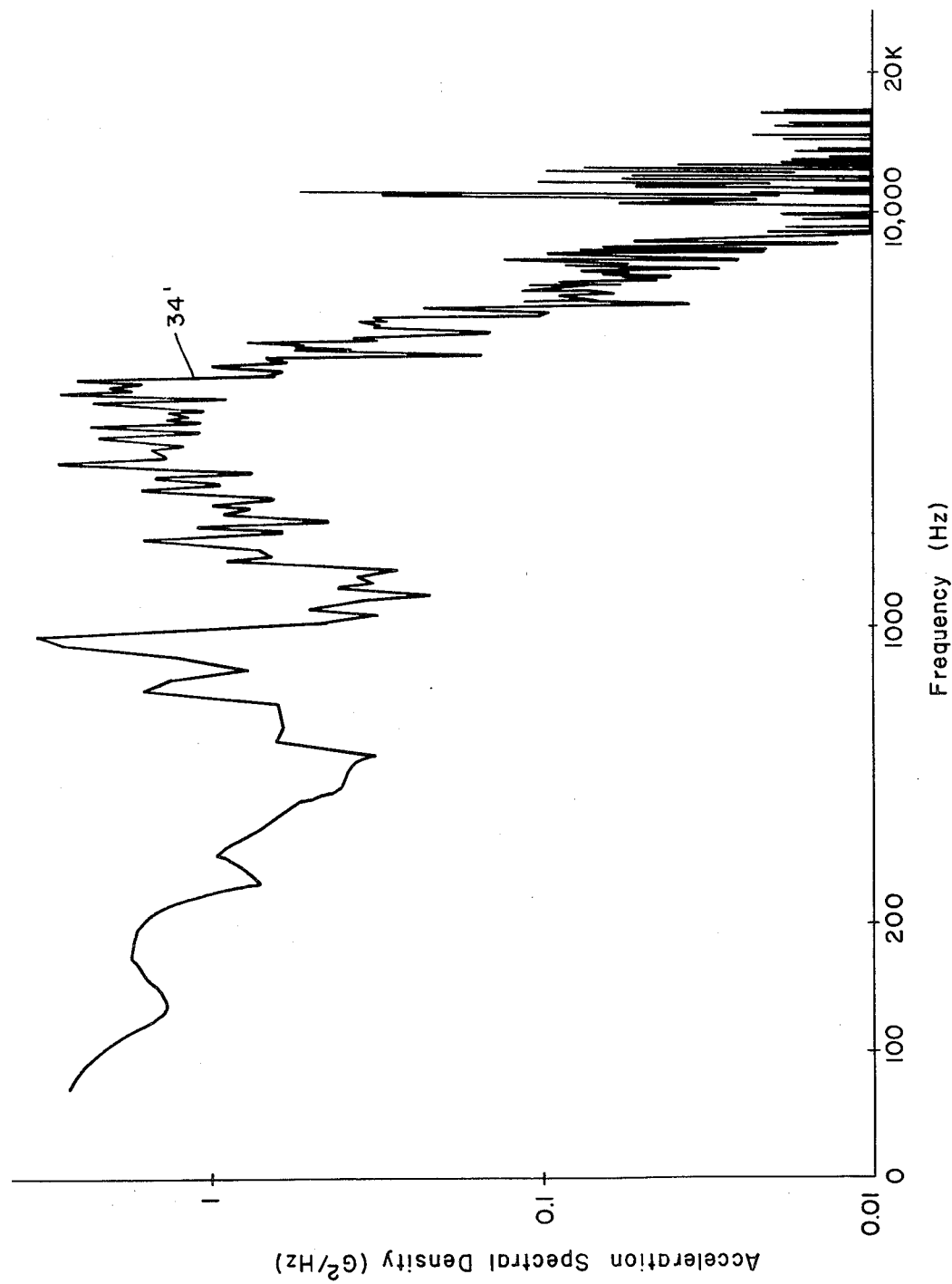
FIGS. 2' and 2" schematically depicts the at rest and excited energy transforms in the shaker table assembly of FIGS. 3-5 from the pneumatic vibrators, through the driving structure, the elastomeric coupling and the driven structure, to a test item, with representative frequency curves therefor shown in FIGS. 2a-2f.
Figure 2C:
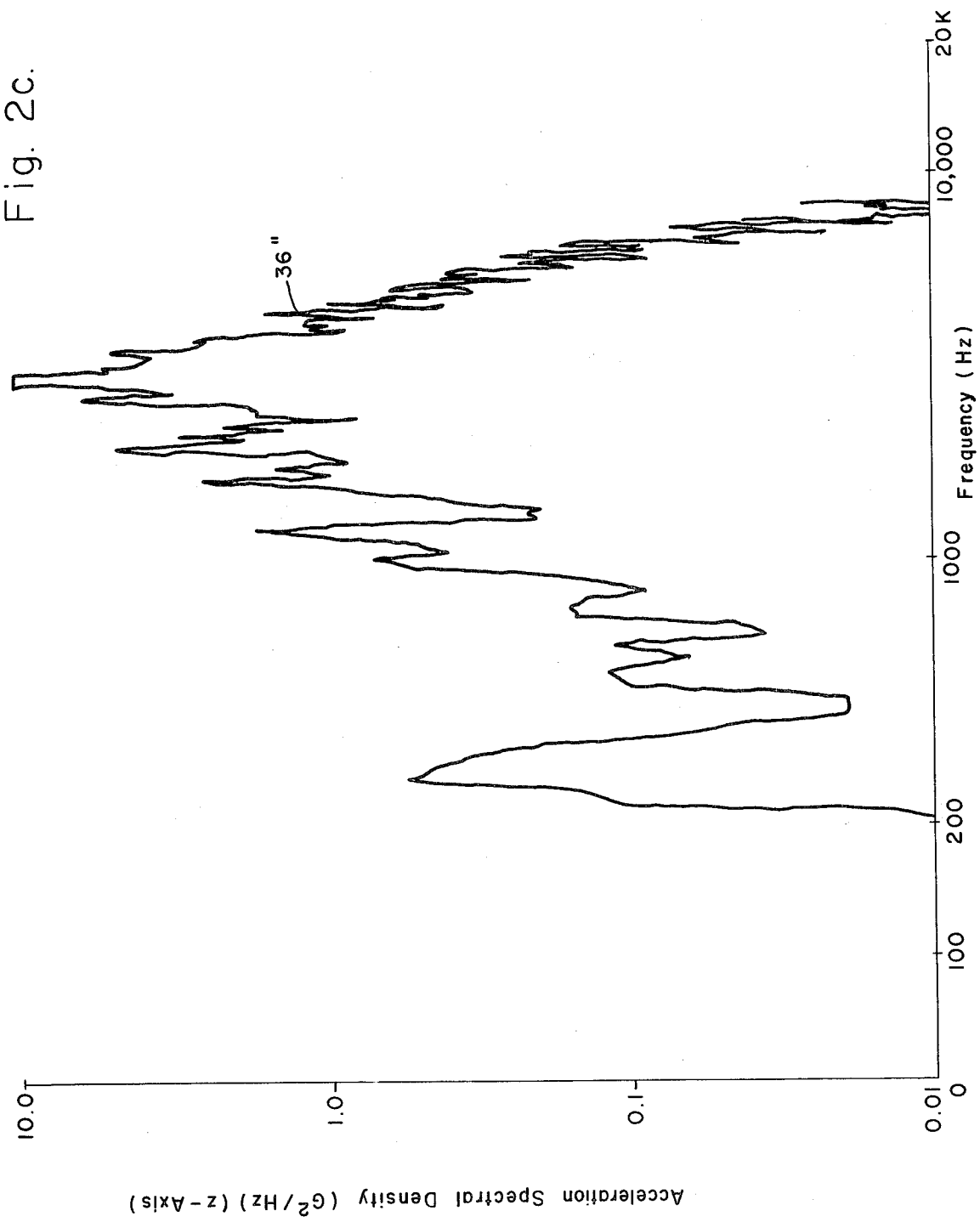
Figure 2E:
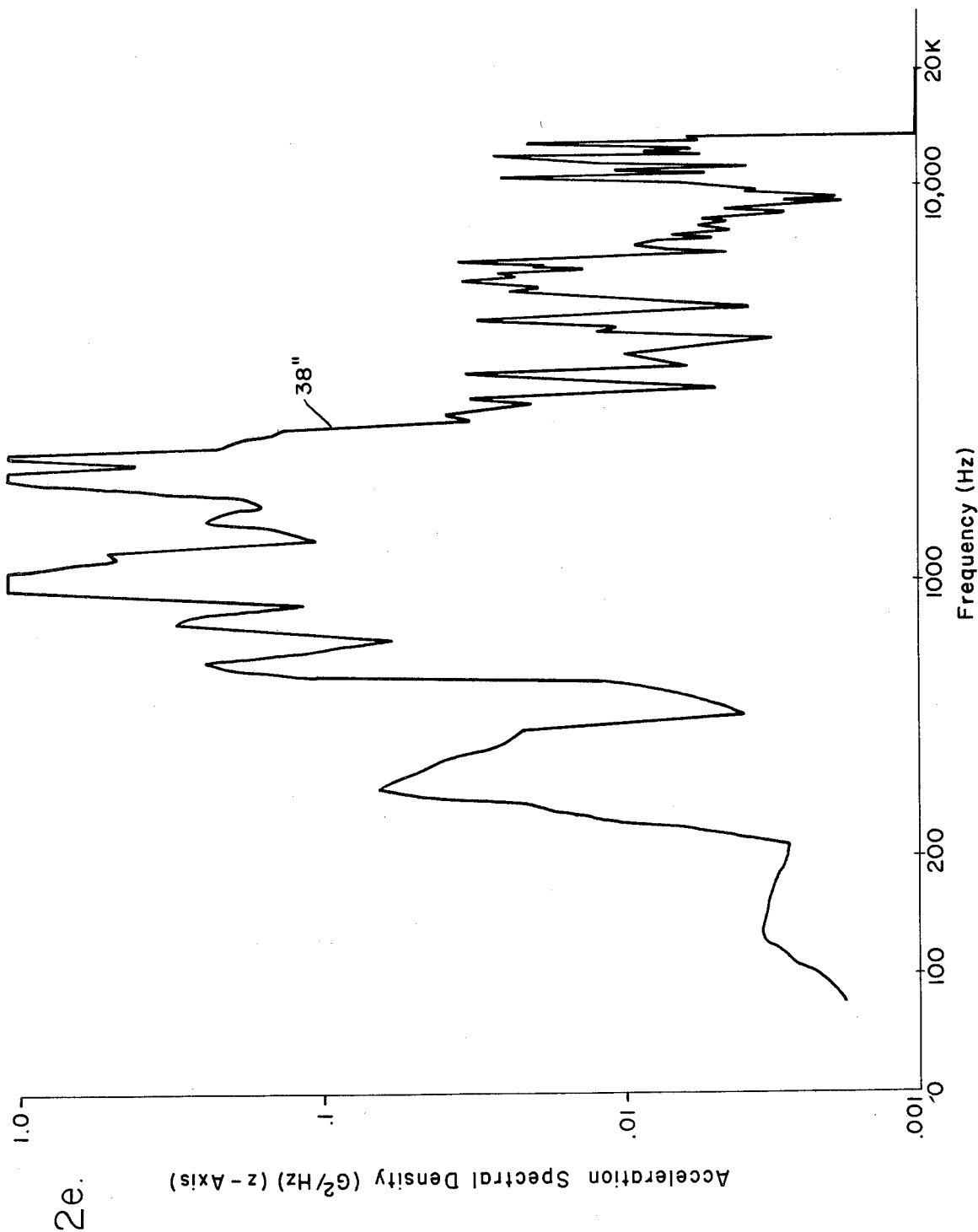
Figure 2F:
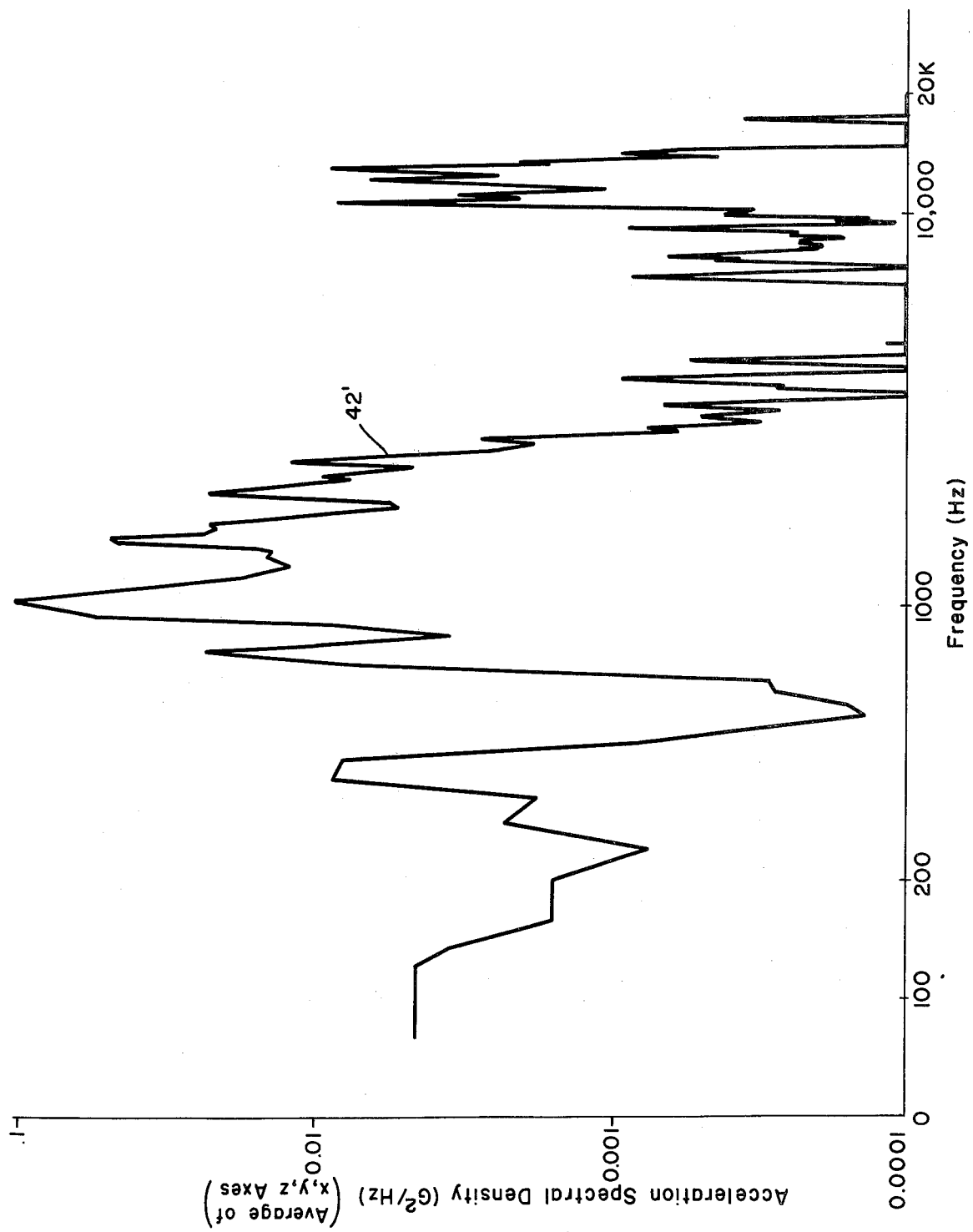

Accompanying the structure illustrated in FIGS. 2' and 2" and depicted in FIGS. 2a-2f are representative curves depicting the relationship between acceleration spectral density, in $G^2/Hz$, and frequency, in Hz, with curve 34' measured normal to the piston axis of pneumatic vibrator 34 (FIG. 2a), with curves 36' and 36" showing the power spectral density graphs respectively in the "x" and "z" directions for driving structure 36 (FIGS. 2b and 2c), with curves 38' and 38" showing the power spectral density graphs respectively in the "x" and "z" directions for driven structure 38 (FIGS. 2d and 2e), and with curve 42' measured at test item 42 depicting the vibrations in three directions applied thereto (FIG. 2f). The vibrational output from driven structure 38 is sensed by accelerometers 44 which are fed into feedback and overtest protective subsystem 28.

The basis of the mechanical vibration device embodied in shaker table assembly 20 is that a structure can be excited in many translational and rotational vibration modes, dominated by multiples of both the excitation frequency and the natural frequencies of the structure. The frequencies of the first few natural modes of the structure embodied in driving structure 36 are by design not integer multiples of the primary excitation frequency obtained from pneumatic vibrators 34 to insure a power equality in forced and natural spectra. The complex modal coupling between initially excited structure 36 and driven structure 38 results in a rich composite of vibratory modal history arising from individual and unified structures behavior as modified by viscoelastic coupling 40. Test item 42 is subjected to the resulting vibration spectrum. The means by which driving structure 36 and driven structure 38 are coupled makes it possible to obtain a controllable power spectrum, with specific acceleration level limits from 40 Hz to 2 kHz, which are limits of vibration frequency for typical military specifications. As further described in copending application, Ser. No. 897,822 filed herewith, "Nodal/Modal Control and Power Intensification Methods and Apparatus for Vibration Testing" by Charles F. Talbott, Jr., the elastomeric materials of construction 40 have specifically tailored shapes and properties and are inserted with associated mechanisms between the driving and driven structures for control and power intensification purposes. The visco-elastic transmissibility and filtering characteristics of the chosen elastomers allow a roll-off of the vibration acceleration spectrum input to the test article at or near the upper frequency limit, regardless of the high frequencies excited in driving structure 36.

Vibrators 34 preferably comprise impacting free-piston pneumatic vibrators rather than air-cushioned free-piston pneumatic vibrators, rotary pneumatic vibrators or otherwise operated vibrators, such as by hydraulic and electro-mechanical means, but those can be used if the desired types of dominant vibrational frequencies are obtainable therefrom. Impact vibrators are preferred so that the sliding piston therein impacts on at least one of the vibrator housing end surfaces after the drive gas pressure reaches some threshold. This impact gives rise to a repeatable chain of mechanical vibratory transients that are rich in harmonic content having a very broad spectral characteristic, typically covering a range from about 50 Hz to several thousand Hertz, the upper limit depending largely on the resonant characteristic of the structure on which the vibrator is mounted. It is preferred also to use different sizes and combinations of vibrators characterized by different rigid body fundamental frequencies for a given gas pressure in conjunction with the structural frequency response of the shaker components and the mass thereon. The gas pressure determines the fundamental or lowest repetition rate and the resulting impact force level.

Uniform vibrational energy coupling between the shaker elements is desirable at every frequency between the lowest attainable frequency and approximately 2 kHz. However, much of the input energy is concentrated around multiples of the fundamental rigid body frequency of the free piston vibrators. This condition dictates a requirement for modulation of the drive pressure sufficient to cause an excursion of the fundamental pulse repetition frequency of 25% to 50% about the nominal. Such excursion causes a "smearing" of the frequency spectrum and assures that there is sufficient vibrational energy present for a predictable percentage of the test time at every frequency without causing a "lock-on" at any given frequency.

Figure 3:
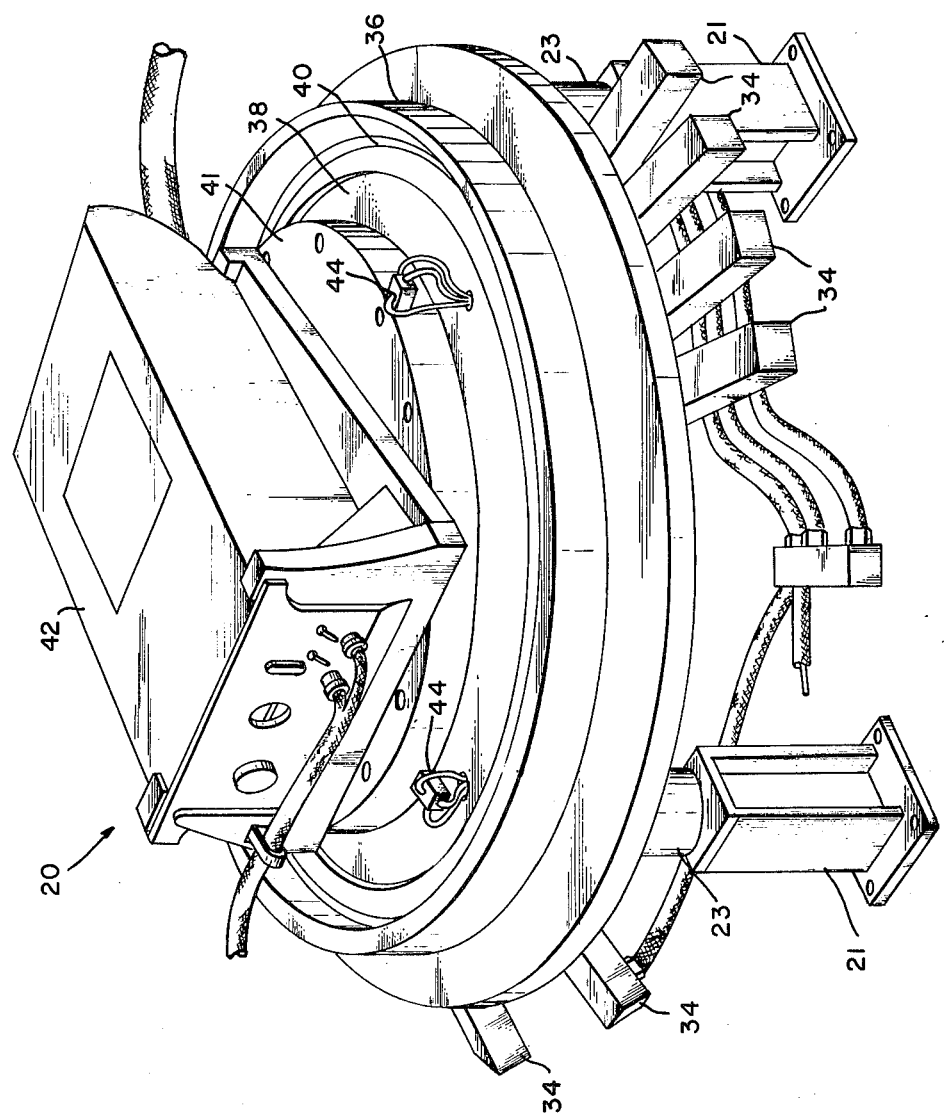
FIGS. 3-5 illustrate embodiments of the shaker table assembly useful for use in the system of FIG. 1.
Figure 4:
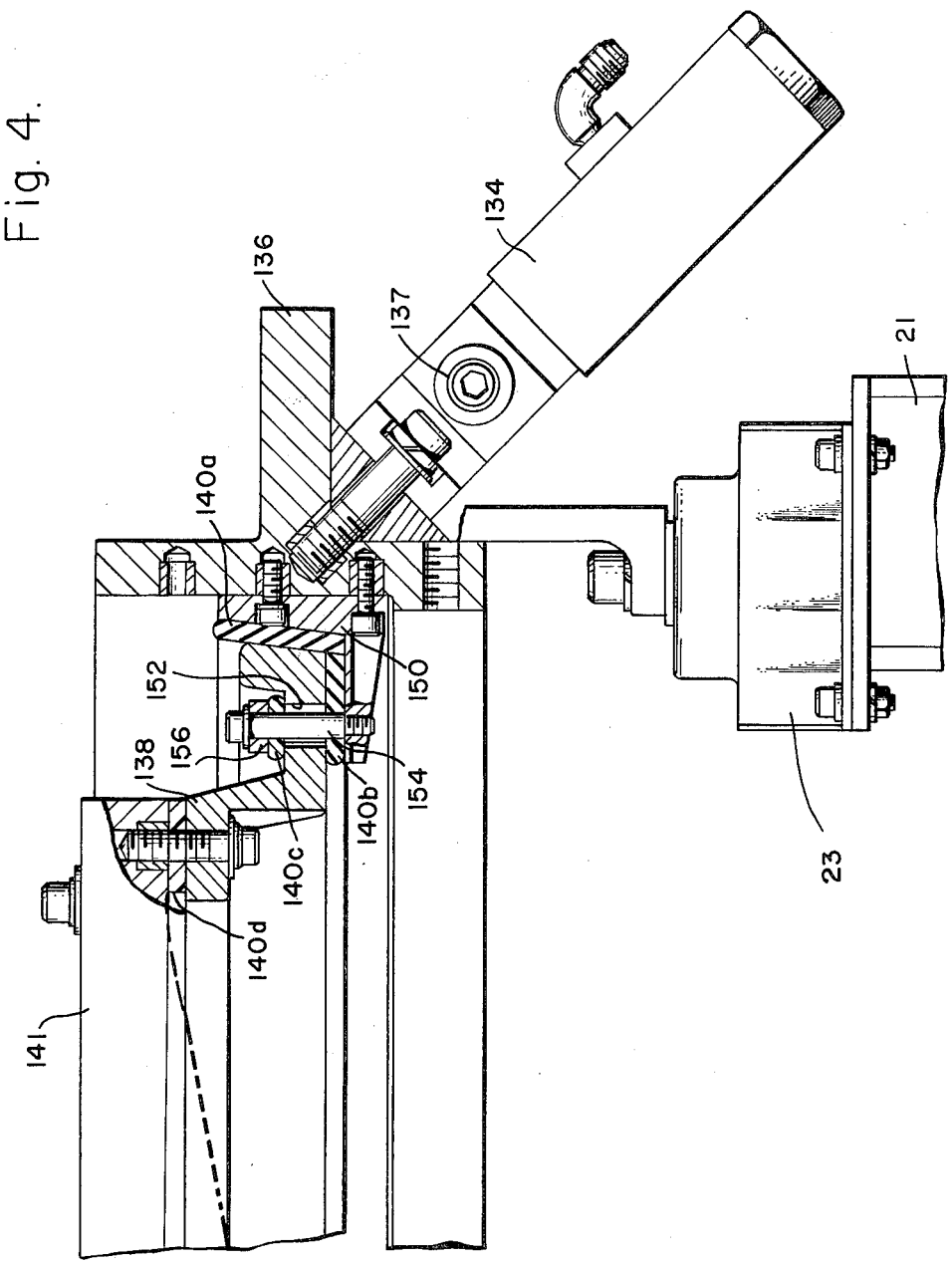
Figure 5:
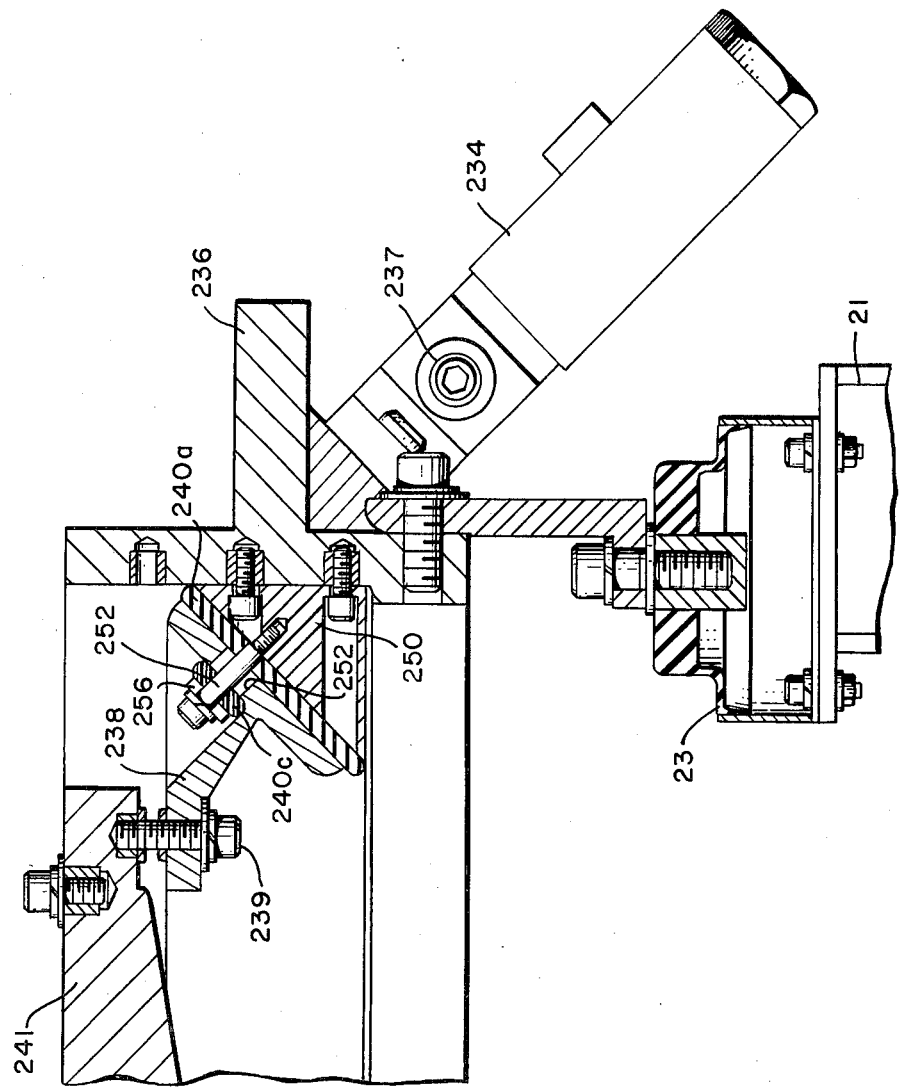

While the following description of the system illustrated in FIG. 1 in the next several paragraphs ending with reference to FIGS. 3-5 is set forth in detail, it is not intended that such detail be or comprise the main inventive embodiment of this disclosure. Such detail is included solely for completeness of the disclosure, especially with regard to the best mode for optimizing operation of the quasi-random shaker.

As stated above, pneumatic vibrators 34 are actuated by air pressure and flow control mechanism 22. Specifically, a vibrator or group of vibrators is connected to solenoid operated air valves 48. Each air valve 48 is maintained in an open position during operation of the system, and each is coupled to a drive manifold 52 for uniform supply of air equally to all solenoid valves. Solenoid valves are electrically operated by appropriate drive circuitry 50 which is coupled to microprocessor 26 through hardware protection circuitry 32. In the event that an overtest or other damaging conditions arise, hardware protection circuitry 32 opens the circuit between microprocessor 26 and drive circuitry 50 to close solenoid valve or valves 48 and thereby prevent air from being supplied to vibrators 34. In such a manner, vibratory input to shaker table assembly 20 is terminated. The signal from drive circuitry 50 also causes an atmospheric vent 51, coupled to drive manifold 52, to open, thus permitting release of pressure therefrom.

Drive manifold 52 comprises a plenum to insure a uniform flow of air equally to all vibrators. Air pressure switches 54 and switch inputs 56 are coupled in series between drive manifold 52 and micro-processor 26 and may be used for one or more purposes. They can activate limit switches to cut off the flow of air to the manifold in the event that the air pressure drops below a preset pressure, to cut off air flow if the pressure is too high, and to assure that the pressure is adequately high in the drive manifold prior to commencement of the test.

Air to drive manifold 52 is supplied through a variable area orifice 58 through a conduit 89. Its purpose is to vary the drive manifold pressure level with respect to time so that a greater or lesser amount of air will be supplied to pneumatic vibrators 34 which, in turn, will then cause different levels of vibration to be exerted against driving structure 36. Variable-area orifice 58 is driven by a flow-control mechanism 60 which, in turn, is driven by variable-flow control drive circuitry 62 from microprocessor 26.

The average pressure of air over a period of time is controlled by an air-pressure regulator 66 which, in turn, is controlled by a regulator servo 68 and air-pressure regulator servo drive circuitry 70 operated from microprocessor 26. Limit switches 72 prevent overtravel of its mechanism. The purpose of air-pressure regulator 66 is to insure that the proper average flow and pressure of air be supplied to variable-area orifice 58 over a period of time.

Air is supplied to regulator 66 from an air supply 74, and the air is filtered through an air filter 76.

In further partial explanation of the operation of the system, before vibrational testing of test item 42 occurs, the pressure in drive manifold 52 is sensed through air pressure switches 54 so that air pressure regulator 66 can be set to supply that pressure and quantity of air which is required to start pneumatic vibrators 34 when the vibration test begins. After the start of the test, the average of the acceleration levels for a set period of time, e.g., 2½ minutes, is sensed by accelerometers 44 to operate air pressure regulator 66. Meanwhile, the program input from microprocessor 26 to variable area orifice 58 continues at a rapid pace, e.g., 2¾ seconds per pressure change. The variable area orifice is varied while the average acceleration levels are taken, in order to control the average pressure of air supplied to the pneumatic vibrators, so that the average acceleration response (Grms) is controlled.

Coupled with this operation, regulator and orifice limit switches 72 and 64 are actuated to prevent signals from operating the servos beyond what is desired, as well as to so forward this information to the microprocessor.

The operation of feedback and overtest protective subsystem 28 is as follows. Subsystem 28 receives signals from accelerometers 44 and provides two functions, a first being overtest protection and the second being notification of vibration test information to the microprocessor.

This latter function employs low-pass filter and sample-and-hold function 46, a multiplexer 140, and an analog-to-digital converter 142. Their purpose is to digitize the analog signal from the selected accelerometers for the purpose of determining the root-mean-square acceleration level of the test item. For a multi-axis screening facility, an average of two to six accelerometer signals from at least two and preferably three of the three orthogonal directions is required. Multiplexer 140 permits handling of signals simultaneously from more than one axis. In operation, microprocessor 26 through electrical connection 143 addresses the sample-and-hold function in component 46 to have it either sample or hold the analog accelerometer signal, as well as to address mutiplexer 140 to select the channel or accelerometer signal applied to analog-to-digital converter 142. A channel selector 145 determines the number of accelerometer channels which microprocessor 26 is to address to multiplexer 140.

As shown in FIG. 1, subsystem 28 has a secondary function to provide for overtest protection, utilizing auxiliary multiplexers 144, a peak detector 146, and an overtest protective function 148. These components are of conventional design. In operation, channel selector 145 determines the number of accelerometer channels which auxiliary multiplexer 144 scans so that unfiltered signals from accelerometers 44 are properly fed to these components and therefrom to hardware protection circuitry 32. In the event that the vibrational level of shaker table assembly 20 becomes too great, as sensed by accelerometers 44, this information is processed to permit hardware protection circuitry 32 to interrupt the operating signal from microprocessor 26 to solenoid valves 48, thereby to prevent further supply of air to pneumatic vibrators 34.

Air pressure switches 54 are used to determine what the drive manifold pressure is and to preset the pressure at a desired level. At least two switches are utilized for nominal and low pressure, respectively to preset the pressure and to turn the test off at a selected low pressure to prevent vibration below a particular switch setting. If desired, a high pressure switch may be used to prevent vibration above a specified level.

The operator interface subsystem, denoted generally by indicium 30, is coupled to microprocessor 26 timing circuitry 150, and hardware protection circuitry 32 and embodies those functions which the operator actuates or is displayed. A test enable start/stop function 152 begins or ends the test. A test-time display 154 and a test-level display 156 respectively show the time and the level of RMS acceleration during test. A test-time duration setting 158 and a test-level setting 160 respectively set the duration and level of the test.

Timing circuitry 150 is coupled between microprocessor 26 and hardware protection circuitry 32 for the purpose of enabling the operator to set the duration of the test and to enable the control system to stop the vibration after the test time period has elapsed. The output from the counter is connected to display 154 to indicate the time remaining for the test. Upon reaching zero time at the end of the test period, a signal is sent to hardware protection circuitry 32 which causes the test to stop. The same signal is also forwarded to microprocessor 26.

The purpose of hardware protection circuitry 32 is to interconnect the various failure detect circuitry, the operator inputs, and microprocessor 26. Its failure-detect control is derived from the overtest protective function, the timing circuitry, and the test enable, start and stop functions. When the test is enabled and started, microprocessor 26 has full control of solenoid valves 48, subject to hardware protection circuitry 32. If the overtest protection function 148 detects an overtest condition, for example, the micro-processor loses control of the servo valve. Identical results occur when the timing circuitry times out. The status of hardware protection circuitry 32 is indicated by status indicators 161.

Microprocessor 26 has several functions. It modulates the air pressure, it receives and processes vibrational signals from the accelerometers, and it performs system and self-tests. Air pressure modulation occurs by varying the orifice area openings of orifice 58. It receives and processes accelerometer signals from accelerometers 44, as first processed by low-pass filter and sample-and-hold function 46, multiplexer 140, and analog-to-digital converter 142. Based upon the receipt of the acceleration signals, the microprocessor is capable of detecting accelerometer anomalies. It also estimates the Grms level which is displayed on test-level display 156, which is compared with internally programmed upper and lower limits to stop vibration if the Grms exceeds the program limits, and is used to adjust air pressure regulator 66. Its system self-tests and are to determine the occurrence of circuitry or mechanical failure. Such microprocessors are conventional, an 8-bit microprocessor being suitable.

In operation, the microprocessor is programmed to continuously change the orifice area in variable-area orifice 58 every 1 to 2 seconds in order to preclude shaker table assembly 20 from locking onto any particular vibration, especially a natural mode thereof. These changes, effected in variable area orifice 58, are pseudo-random and have any desired distribution, e.g., uniform. As stated above, by pseudo-random, it is meant that there is a mathematical method or algorithm for selecting a sequence of numbers. This sequence is random in the sense that it obeys certain statistical laws of randomness. By pseudo, it is meant that the randomness is not purely random because the sequence results from predetermined calculations. By uniformity, it is meant that every drive manifold pressure is equally likely to be selected. A finite number of opening positions has been selected to be 128, as an example.

Referring now to FIG. 3, an annular, multi-axis, complex mode, pneumatically activated vibration test device 20 is supported on a base generally denoted by pedestals 21 and isolators 23. Coupled to isolators 23 is driving structure 36 and driven structure 38 coupled together by shaped elastomeric coupling 40, all of annular configuration. Placed on driven structure 38 is a test fixture 41 to which test item 42 is secured.

The annular structures may take several desired configurations, two of which are illustrated in FIGS. 4 and 5. In both cases, pneumatic vibrators 134 and 234 are secured to driving annular structures 136 and 236 respectively by a pivotal connections 137 and 237 and other hardware, such as machine bolts. The pivotal connections enable the vibrators to be directed at an angle to the annular driving structures so that the direction of vibratory input may be varied as desired or required. In addition, the bolting may be secured otherwise than as depicted.

In both FIGS. 4 and 5, driving annular structures 136 and 236 and test fixtures 141 and 241 generally have the same configuration. Thus, for the purposes of describing the present invention, these structures may be shown exactly alike; however, they need not be identical.

In between the driving structure and a test fixture, several modifications are illustrated. In FIG. 4, the shaped elastomeric couplings include a first inclined annular elastomeric piece 140a, an elastomeric ring 140b, and second elastomeric ring 140c. Elastomeric piece 140a and ring 140b are supported on an L-shaped annular shelf 150 which is bolted or otherwise secured to annular driving structure 136 or which can be made integral therewith. Positioned on elastomeric piece 140a and ring 140b is driven structure 138. Structure 138 is provided with plurality of oversized holes 152 through which bolts 154 extend. The bolts secure driven structure 138 to driving structure 136 by means of shelf 150, oversized holes 152 permitting by design relative movement between the driving and driven structures during vibrational excitations. In its attachment to shelf 150, driven structure 138 is sandwiched between elastomeric rings 140b and 140c through which bolts 154 also extend, with a retainer ring 156 placed over elastomeric ring 140c. Driven structure 138 may be made of multiple components for directional vibrational compliance. A test item platform 141 is one such component and is secured to driven structure 138, e.g., with vibration multiplying elastomer ring 140d therebetween.

In FIG. 5, a slightly modified construction includes a shelf 250 having a triangular cross-section which is bolted or made integral with driving annular structure 236. Rather than using a pair of elastomeric rings 140a and 140b of FIG. 4, a single diagonally placed elastomeric ring 240a is employed and is sandwiched between modal driven structure 238 and shelf 250. In a manner similar to that described before, an elastomeric ring 240c and its retaining ring 256 are placed on the side of the driven structures 238 opposite from elastomeric ring 240a. A bolt 254 extends through rings 256 and 240a and is engaged with shelf 250. Also, in a manner similar to that described with respect to FIG. 4, openings 252 in driven annular structure 238, through which bolts 254 extend, are of larger diameter than that of the bolts so that movement between the driven and driving structures can be provided during vibratory excitation.

The physical properties of the elastomeric materials 40, 140 and 240 are used to direct, filter and attenuate the amplitude of the time-space variant displacements from the driving structure interface to the driven structure interface. The non-linear transmissive properties of these elastomers are used to control the transmissibility over a frequency range near 2 kHz and also to inhibit vibration transmission above 2 kHz due to damping and stiffness property changes as certain frequencies are encountered.

The ring-shaped driving structure is excited by the attached pneumatic vibrators to oscillate them in multiple modes of forced and resonant response, as illustrated in FIG. 2. The continuous annular surface or surfaces to which the elastomeric couplings are attached exhibit high inherent modal density at points along a circumference because of the typically out-of-phase displacements due to ring bending in and out of plane and torsional modes about the ring axis. The driven structure exhibits at this annular interface the multiplicity of frequencies, acceleration and direction at any instant of integration with time about the circumference.

The modal density of the vibration history of the driven structure is governed by the complex forced vibration spectrum introduced through the elastomers from the driving structure and by the design of the resonant and harmonic coupled frequencies of the driven structure. Mutually coupled vibration modes of driving-driven structures are defined and limited by both contact patterns and transmissibility characteristics of the elastomeric couplings and may be altered by changing compliance between driven annular structure 238 and test fixture 241 with altered length of flexible structure bolts 239. The test article may be fixed to any number of attachments on the driven structure or it may be supported by an interfacing test item platform 241 as shown. If desired, to further modulate the excitation history to which the test articles are exposed, a selective configuration of elastomeric material may be interposed between the sets of driven structure as illustrated in FIGS. 4 and 5, with or without shims to affect the elastomeric content of the material. It is thus possible to further modify frequency and displacement-directional history.

Tests of the present invention have demonstrated good multi-modal, multi-directional input characteristics, with good uniformity of overall acceleration distribution. By modulating the pneumatic vibrator output by pressure changes, a beneficial forced frequency/harmonic smearing of the power spectrum is effected. Furthermore, altering the shape, consistency and stiffness/damping characteristic of the elastomer to enhance multiplicity of anti-nodes provides for a usable power control/modulation technique for selective frequency/amplitude modulation. In conjunction with the closed-loop, pseudo-random pneumatic pressure controls system, the present invention provides for modal density and acceleration uniformity for multi-degrees-of-freedom with desired frequency roll-off for which it was intended.

Although the invention has been described with reference to particular embodiments thereof, it should be realized that various changes and modifications may be made therein without departing from the spirit and scope of the invention.

What is claimed is:

1. A shaker for vibration testing of a test item comprising an annular driving structure, an annular driven structure supporting the test item, a visco-elastic structure coupling said driving and driven structures together, and means coupled to said driving structure for imparting vibratory excitations thereto.

2. A shaker according to claim 1 wherein said vibratory excitations cause time-space displacements of said driving structure and wherein said visco-elastic structure includes elastomeric materials for directing, filtering and attenuating the amplitude of the time-space variant displacements from said driving structure to said driven structure at the visco-elastic coupling interfaces therebetween.

3. A shaker according to claim 2 wherein said elastomeric materials have non-linear transmissive properties and are placed at selected locations between said driving and driven structures for selectively controlling the transmissibility of the vibratory excitations over a selected frequency range and for inhibiting transmission of the vibratory excitations beyond the selected frequency range.

4. A shaker according to claim 3 wherein said elastomeric materials are configured as patterns for defining the selected locations of contact between said driving and driven structures, said contact patterns and the transmissive properties of said elastomeric cooperating to effect mutually coupled vibration modes of driving-driven intercoupling between said driving and driven structures.

5. A shaker according to claim 2 or 4 wherein said driving and driven structures respectively comprise rings for defining, with said visco-elastic structure, a concentric sandwich structure, with said vibratory excitation imparting means causing said driving ring to vibrate in multiple bending and torsional modes and to impart displacements at many different rates and amplitudes along the length and breadth of said visco-elastic coupling interfaces, thereby for causing a multi-degree-of-freedom multi-phase multimodal displacement-time history at the test item.

6. A shaker according to claim 5 further including a platform supporting the test item for coupling said driven ring with the test item.

7. A shaker according to claim 5 wherein said vibratory excitation imparting means comprise pneumatic vibrators, and further including means including an air supply for driving said pneumatic vibrators.

8. In a vibration system having means for supporting a test item including a platform on which said test item is positioned, and a driving member, a driven member, and visco-elastic material coupling said driving and driven members together; vibrators coupled to said driving member and capable of time-variable vibrating output and operable with said supporting means for generating quasi-random, simultaneous multi-axis vibration in the test item; means coupled to said vibrators for automatically causing said vibrators to vary their vibratory output and thereby for enhancing the randomness in the multi-axis vibration; and means defining a closed loop with the multi-axis vibration and said vibrators for sensing and controlling the level of the multi-axis vibration, the improvement in said driving and driven members in which said members comprise rings concentrically coupled together by said visco-elastic material to form a concentric, sandwiched arrangement.

9. A method for quasi-randomly varying vibration frequencies applied to a test item comprising the steps of producing and varying frequencies, utilizing the frequencies for an excited, time-varying combination of bending and torsional structure behavior and visco-elasticity of elastomers for superimposing multimodal, multi-phase, multi-directional simultaneously produced quasi-random vibrations, and applying the vibrations to the test item.

10. A method according to claim 9 wherein said superimposing step includes the steps of three-dimensionally flexing a pair of annular structures coupled together by means having visco-elastic properties, coupling the modes of each annular structure for effecting multimodal vibration, introducing the vibration to a flexible support on which the test item is positioned for effecting further complexity of the vibration, and varying a means for producing the frequencies for effecting changes in the frequencies and acceleration levels imparted to the structures.

11. A method according to claims 9 or 10 further including the step of utilizing air for driving pneumatic vibrators by which the vibration frequencies are produced.

* * * * *